United States Patent
Tadano (10) Patent No.: US 7,800,064 B2
(45) Date of Patent: Sep. 21, 2010

(54) IMAGE PICKUP APPARATUS

(75) Inventor: Shoji Tadano, Kanagawa (JP)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 12/146,528

(22) Filed: Jun. 26, 2008

(65) Prior Publication Data

US 2009/0001269 A1 Jan. 1, 2009

(30) Foreign Application Priority Data

Jun. 28, 2007 (JP) .......................... P2007-169964

(51) Int. Cl.
*G02F 1/01* (2006.01)
(52) U.S. Cl. ...................................... 250/330
(58) Field of Classification Search ................. 250/330
See application file for complete search history.

(56) References Cited

U.S. PATENT DOCUMENTS

2006/0266942 A1 11/2006 Ikeda

FOREIGN PATENT DOCUMENTS

| JP | 10 73412 | 3/1998 |
| JP | 2005 223605 | 8/2005 |
| JP | 2006 333132 | 12/2006 |

OTHER PUBLICATIONS

Conaire et al., "Background Modelling in Infrared and Visible Spectrum Video for People Tracking," 2005, IEEE Coimputer Society Conference on Computer Vision and Pattern Recognition, vol. 1063-6919/05.*

Cucchiara et al., "Detecting Moving Objects, Ghosts, and Shadows in Video Streams," 2003, IEEE Transactions on Pattern Analysis and Machine Intelligence, vol. 25, No. 10, pp. 1337-1342.*

Waxman et al., "Progress on color night vision: Visible/IR Fusion, Perception & Search, and Low-Light CCD Imaging," 1996, SPIE Proceedings, vol. 2736, pp. 96-107.*

Johnson et al., "Commerial Fusion Camera," 2006, SPIE Proceedings, vol. 6205, pp. 62050H-1-62050H-9.*

Stauffer et al., "Adaptive background mixture models for real-time tracking," 1999, IEEE Computer Vision and Pattern Recognition Conference, vol. 2, pp. 246-252.*

* cited by examiner

*Primary Examiner*—David P Porta
*Assistant Examiner*—Kiho Kim
(74) *Attorney, Agent, or Firm*—Frommer Lawrence & Haug LLP; William S. Frommer; Ellen Marcie Emas (57) ABSTRACT

An image pickup apparatus for outputting image data on an image for which image processing is executed to a computer, the image pickup apparatus including: a thermal image capturing camera for capturing a thermal image; a visible-light camera for capturing an image under a visible light; a temperature zone extracting portion for detecting and extracting a portion corresponding to a predetermined temperature zone given from an outside from the thermal image; a background image extracting portion for extracting an image of an immobile object in the image captured under the visible light by the visible-light camera as a background image; and a synthesizing/outputting portion for synthesizing the portion extracted by the temperature zone extracting portion, and the background image extracted by the background image extracting portion with each other, and outputting image data on a resulting synthetic image.

5 Claims, 7 Drawing Sheets

IMAGE PICKUP APPARATUS

CROSS REFERENCES TO RELATED APPLICATIONS

The present invention contains subject matter related to Japanese Patent Application JP 2008-169964 filed in the Japan Patent Office on Jun. 28, 2007, the entire contents of which being incorporated herein by reference.

BACKGROUND OF THE INVENTION

1. Field of the Invention

The present invention relates to an image pickup apparatus, and more particularly to an image pickup apparatus for outputting image data on an image for which image processing is executed to a computer.

2. Description of the Related Art

Heretofore, there have been conceivable the various techniques for detecting a specific object within an image-capturing range by executing image processing based on an image signal obtained by capturing an image of a subject. Such techniques have been used in monitoring cameras and the like. In addition, there have also been known not only a visible-light camera for capturing an image of a subject by detecting a visible light reflected by or radiated from the object, but also a near-infrared camera and a far-infrared camera. These cameras can identify objects by detecting temperatures of objects of the image-capturing.

Now, the visible-light camera and the infrared camera (far-infrared camera) capture images of different objects each of which can be relatively identified owing to the respective different characteristics. For this reason, there is known a hybrid camera including both the functions of the visible-light camera and the far-infrared camera. The hybrid camera synthesizes (combines) image data on an image captured by the visible-light camera, and image data on an image captured by the far-infrared camera with each other, and displays thereon an image of a subject of image capturing night and day. This technique, for example, is described in Japanese Patent Laid-open No. 10-73412, Japanese Patent Laid-Open Nos. 2006-333132, and 2005-223605.

SUMMARY OF THE INVENTION

In general, a personal computer (PC) for executing signal processing for an image signal is connected to the hybrid camera.

Hereinafter, the processing for synthesizing the image data on the image captured by the visible-light camera, and the image data on the image captured by the far-infrared camera with each other is executed on the PC side. When the signal processing described above is executed, an amount of data to be transmitted to the PC side becomes a sum of an amount of image data on the image captured by the visible-light camera, and an amount of image data on the image captured by the far-infrared camera. As a result, the amount of image data necessarily increases.

In addition, in general, when the hybrid camera is used as a monitoring camera, a plurality of hybrid cameras are connected to one PC in many cases. In such cases, since all the image processing must be executed on the PC side, a heavy load is imposed on the PC side. As a result, a high throughput capacity is required for the PC side.

In addition, the image captured by the far-infrared camera is obtained by visualizing a subject invisible to the eyes of a human being. As a result, there is encountered such a problem that it is hard to sensuously understand the image captured by the far-infrared camera, and thus it is difficult for a human being infamiliar with the image captured by the far-infrared camera to monitor the same.

The present embodiment has been made in the light of such circumstances, and it is therefore desire to provide an image pickup apparatus which is capable of reducing an amount of image data to be transferred, thereby lightening a processing load imposed on a PC side.

In order to attain the desire described above, according to an embodiment of the present invention, there is provided an image pickup apparatus for outputting image data on an image for which image processing is executed to a computer, the image pickup apparatus including:

a thermal image capturing camera for capturing a thermal image;

a visible-light camera for capturing an image under a visible light;

a temperature zone extracting portion for detecting and extracting a portion corresponding to a predetermined temperature zone given from an outside from the thermal image;

a background image extracting portion for extracting an image of an immobile object in the image captured under the visible light by the visible-light camera as a background image; and a synthesizing/outputting portion for synthesizing the portion extracted by the temperature zone extracting portion, and the background image extracted by the background image extracting portion with each other, and outputting image data on a resulting synthetic image.

According to the image pickup apparatus of the embodiment, the thermal image capturing camera captures the thermal image. The visible-light camera captures the image under the visible light. The temperature zone extracting portion detects and extracts the portion corresponding to the predetermined temperature zone given from the outside from the thermal image. The background image extracting portion extracts the image of the immobile object in the image captured under the visible light by the visible-light camera as the background image. Also, the synthesizing/outputting portion synthesizes the portion extracted by the temperature zone extracting portion, and the background image extracted by the background image extracting portion with each other, and outputs the image data on the resulting synthetic image.

DETAILED DESCRIPTION OF THE PREFERRED EMBODIMENTS

According to the present embodiment, since the synthesizing processing for the background image is executed inside the image pickup apparatus, it is possible to reduce an amount of image data outputted to the computer. As a result, it is possible to lighten the processing load imposed on the computer.

A preferred embodiment of the present invention will be described in detail hereinafter with reference to the accompanying drawings. An image pickup apparatus which will be described in the following embodiment includes two kinds of cameras which can respectively detect lights (electromagnetic waves), having different frequency bands, reflected by or radiated from a subject. Such an image pickup apparatus is referred to as "a hybrid camera" herein.

Figure 1:
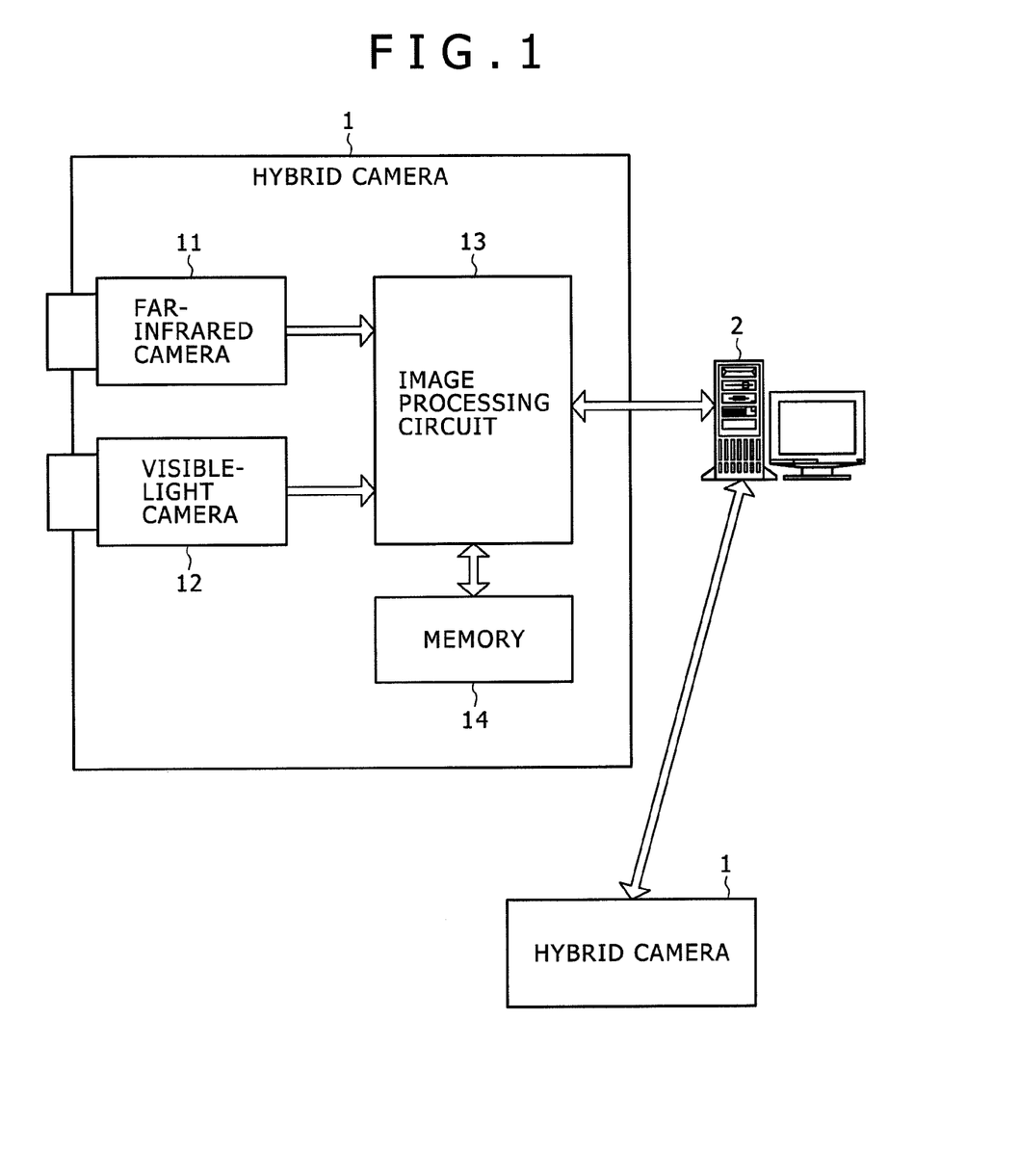
FIG. 1 is a block diagram schematically showing a configuration of an image pickup system including a hybrid camera according to an embodiment of the present invention.

FIG. 1 is a block diagram schematically showing a configuration of an image pickup system including a hybrid camera according to an embodiment of the present invention.

The image pickup system shown in FIG. 1 includes a plurality of hybrid cameras 1, 1 (two hybrid cameras 1, 1 in FIG. 1), and a server (computer) 2.

Each of the hybrid cameras 1, 1 mainly includes a far-infrared camera 11, a visible-light camera 12 and an image processing circuit 13. In this case, the far-infrared camera 11 can detect the electromagnetic wave in a far-infrared radiation region. The visible-light camera 12 can detect a visible light. Also, the image processing circuit 13 executes signal processing by using an image captured by the far-infrared camera 3, and an image captured by the visible-light camera 4.

The hybrid cameras 1, 1 are connected to the server 2 through respective communication lines. For example, an output image from the hybrid camera 1 can be displayed on a monitor connected to the server 2. Or, operation control and various settings for the hybrid camera 1 can be carried out on the server 2 side.

The far-infrared camera 11 and the visible-light camera 12 capture images of subjects, respectively, in the same direction. The far-infrared camera 11, for example, is provided with a pyroelectric element, a bolometer or the like for detecting an energy (heat) of a far-infrared radiation radiated as a sensor for detecting the far-infrared radiation. In addition, the visible-light camera 12, for example, is provided with a solid-state image pickup element such as a charge coupled device (CCD) or a complementary metal oxide semiconductor (CMOS) type image sensor as a sensor for detecting the visible light.

The image processing circuit 13 executes various kinds of signal processing based on image signals obtained through image capturing made by the far-infrared camera 11 and the visible-light camera 12, respectively. In particular, in this embodiment, the image processing circuit 5 executes such signal processing as to detect a specific object from the image capturing range based on both the image signals, and as to clearly specify the detection of the object within the output image.

It is noted that the far-infrared camera 11 and the visible-light camera 12 have functions of converting output signals from respective sensors into digital signals. The image processing circuit 13 executes the image processing based on the digital image signals outputted from the far-infrared camera 11 and the visible-light camera 12, respectively. Also, the far-infrared camera 11 and the visible-light camera 12 may respectively include sensors which are different in number of pixels from each other. However, in this case, a resolution conversion function is provided inside each of the far-infrared camera 11 and the visible-light camera 12. Thus, digital image signals corresponding to the same number of pixels per frame (for example, an image having 256 gradations obtained through the 8-bit digitization) are outputted from the far-infrared camera 11 and the visible-light camera 12 to the image processing circuit 13.

It is noted that the far-infrared camera 11 and the visible-light camera 12 do not necessarily carry out the image capturing operations perfectly at the same timing. For example, the intervals of the image capturing in the far-infrared camera 11 and the visible-light camera 12 may be made different from each other. Needless to say, the intervals of the image capturing in the far-infrared camera 11 and the visible-light camera 12 are preferably close to each other as much as possible.

In addition, the output image obtained from the image processing circuit 13 of the hybrid camera 1 can be displayed on the monitor of the sensor 2. Or, the operation control and the various settings for the hybrid camera 1 can be carried out on the server 2 side.

A memory 14 is constituted by, for example, a synchronous DRAM (SDRAM), and stores therein data or the like outputted by the image processing circuit 13.

Figure 2:
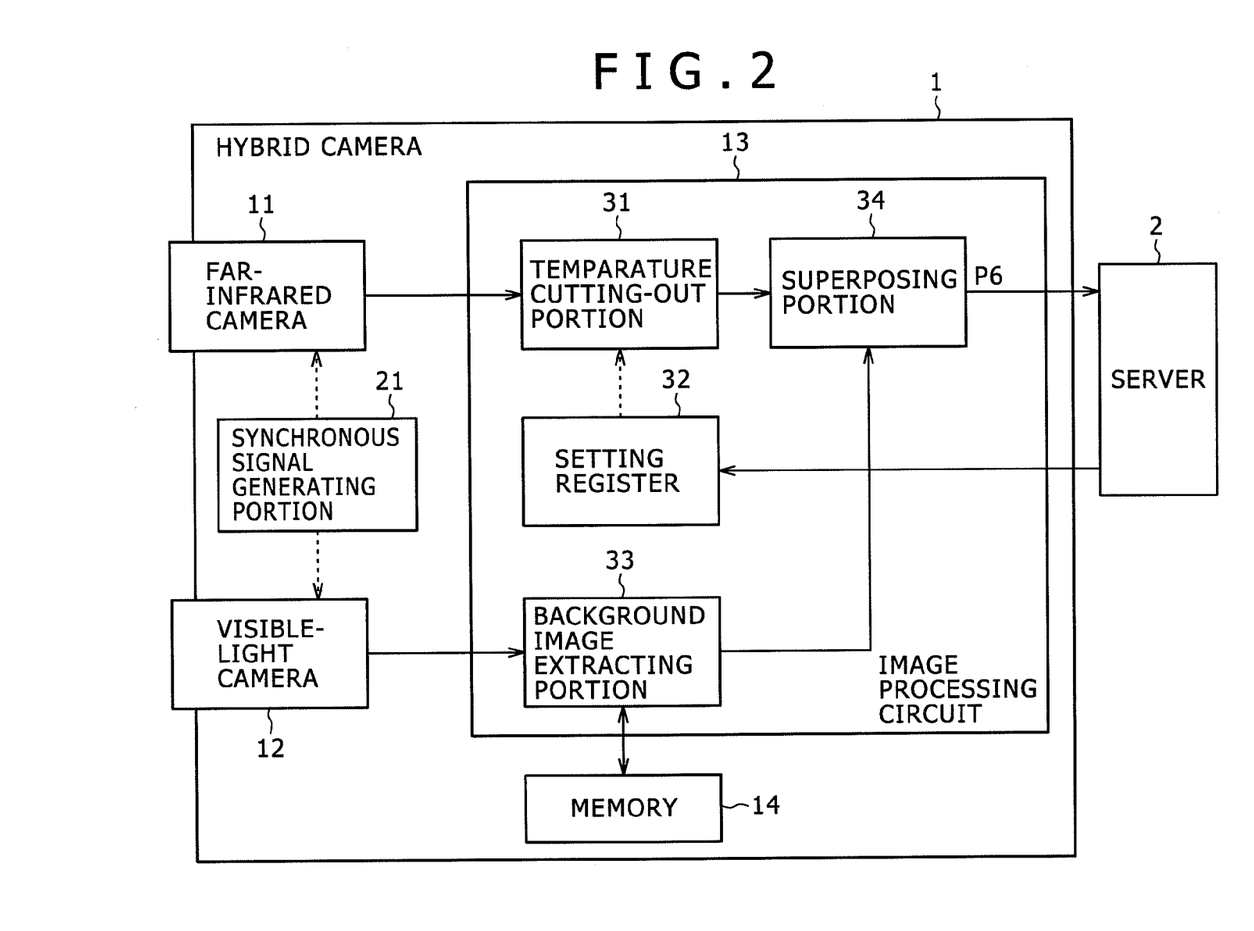
FIG. 2 is a block diagram showing a more detailed internal configuration of the hybrid camera according to the embodiment of the present invention.

FIG. 2 is a block diagram showing a more detailed internal configuration of the hybrid camera according to the embodiment of the present invention.

As shown in FIG. 2, the hybrid camera 1 further includes a synchronous signal generating portion 21. In addition, the image processing circuit 13 of the hybrid camera 1 is composed of a temperature cutting-out portion (corresponding to a temperature zone extracting portion) 31, a setting register 32, a background image extracting portion 33, and a (image) superposing portion (corresponding to a synthesizing/outputting portion) 34.

The synchronous signal generating portion 21 generates a timing signal in accordance with which the far-infrared camera 11 and the visible-light camera 12 capture respective images approximately at the same time, and output image data on the captured images to the image processing circuit 13 approximately at the same timing.

The temperature cutting-out portion 31 cuts out a temperature zone data on which is set in the setting register 32 from the output image obtained from the far-infrared camera 11.

The setting register 32 stores therein the data on the temperature zone set by the server 2.

The background image extracting portion 33 extracts only a background component obtained by excepting a moving body portion (a portion changing before and after the capturing of an image) from an output image obtained from the visible-light camera 12. Here, the memory 14 records therein image data on the background image created by the background image extracting portion 33.

The superposing portion 34 superposes the image created by the temperature cutting-out portion 31, and the background image the image data on which is stored in the memory 14 on each other.

It is noted that although not illustrated in FIG. 1, the hybrid camera 1 includes a function as well of directly outputting image data on the image captured by the visible-light camera 12 to the server 2.

Next, an operation of the hybrid camera (image pickup system) will be described in detail by giving concrete examples.

Figure 3:
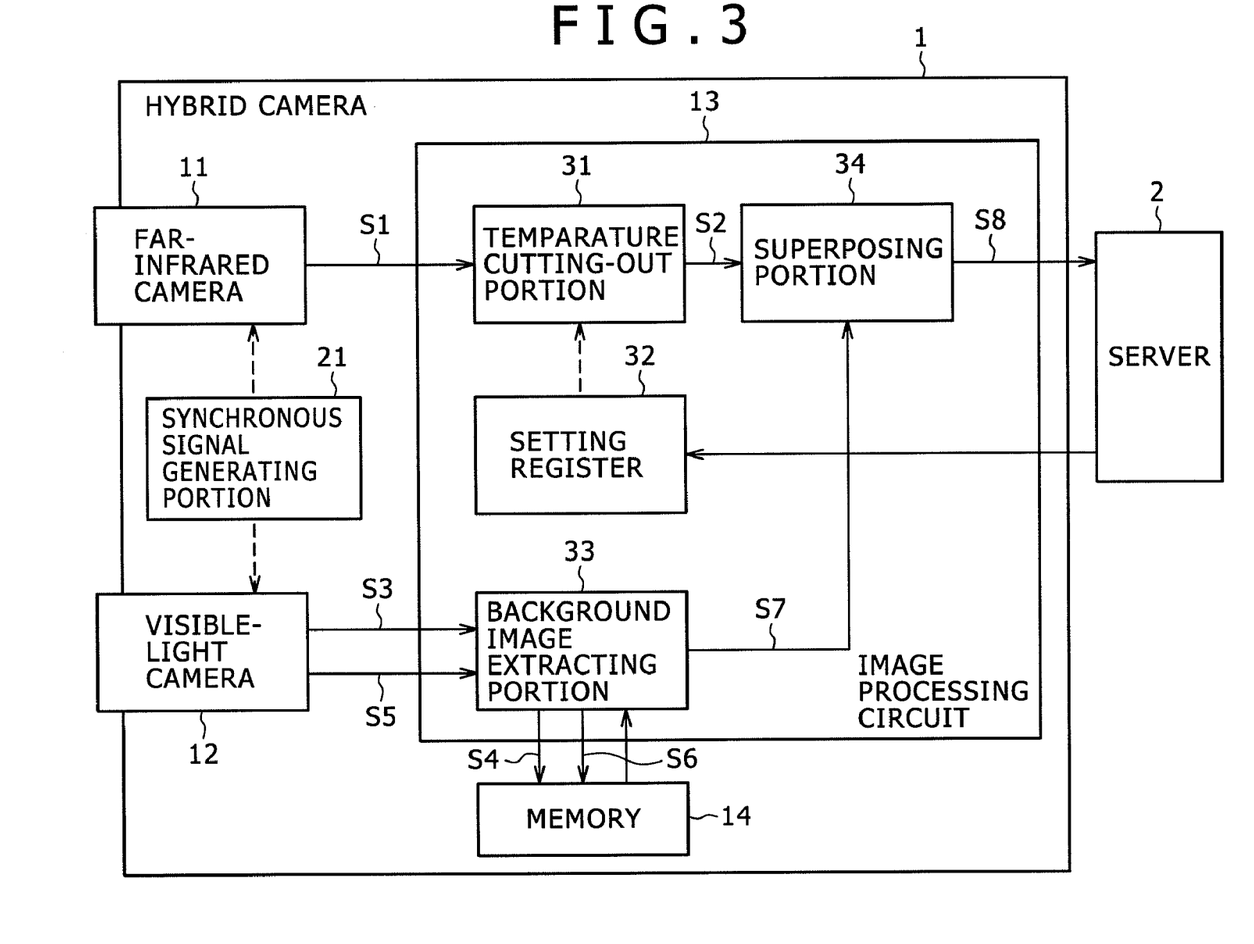
FIG. 3 is a block diagram explaining an operation of the hybrid camera shown in FIG. 2.
Figure 4A:
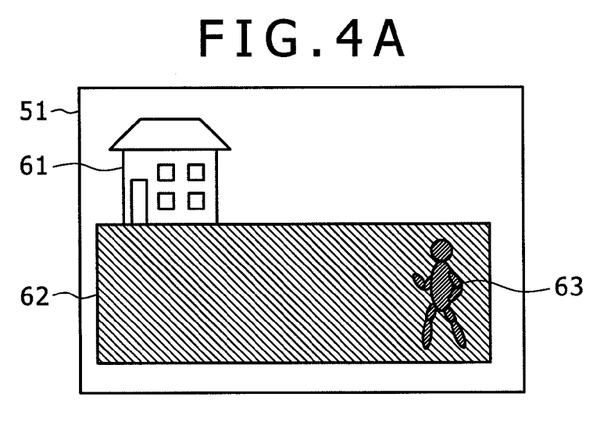
FIGS. 4A to 4D are respectively views showing a concrete example of an image processed by the hybrid camera shown in FIG. 2.
Figure 4B:
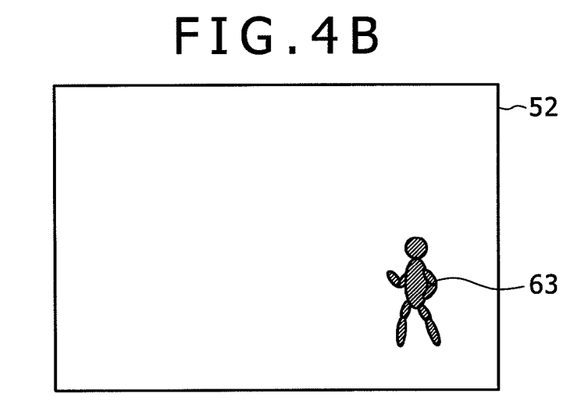
Figure 4C:
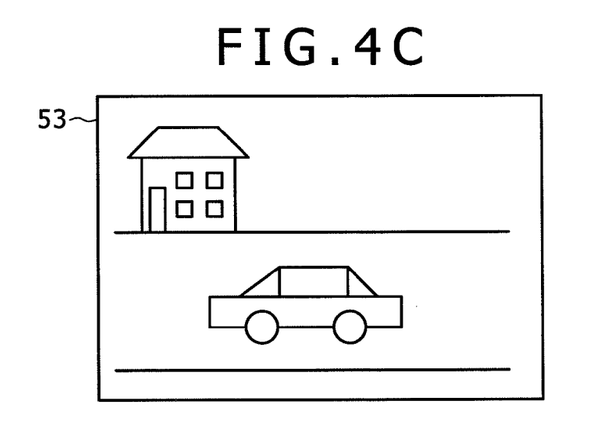
Figure 4D:
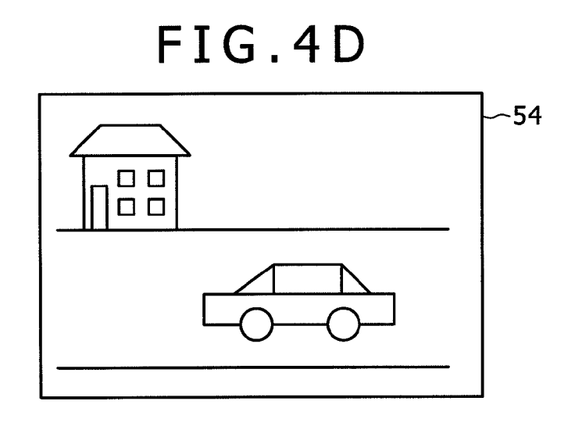

FIG. 3 is a block diagram explaining an operation of the hybrid camera, and FIGS. 4A to 4D to FIGS. 6A and 6B are respectively views showing concrete examples of the image which is processed by the hybrid camera.

With regard to preprocessing, for example, the server 2 sets gradation values (gradation values of "50 to 70" near a radiant energy of a human being when an image of a person 63 is cut out in this concrete example) which a user or the like sets from 8-bit gradation values of "0 to 255" constituting an image in the setting register 32 because he/she desires to perform the temperature cutting-out.

The far-infrared camera 11 outputs image data on an image 51 captured thereby (refer to FIG. 4A) to the temperature cutting-out portion 31 (Step S1 in FIG. 3). Here, it is assumed that the gradation value of an image of a house 61 contained in the image 51 is "10", and the gradation value of an image of a concrete wall 62 contained therein is "200".

Because the gradation values of "50 to 70" are set in the setting register 32, the temperature cutting-out portion 31 uses the untouched gradation values for a portion (the image of the person 63 in FIG. 4A), within the input image, corresponding to the gradation values of "50 to 70" of the pixels. On the other hand, for portions (the images of the house 61 and the concrete wall 62 in FIG. 4A), within the input image, other than the portion corresponding to the gradation values of "50 to 70", the temperature cutting-out portion 31 creates an image 52 (refer to FIG. 4B) which is obtained by replacing each of the gradation values of the images of the house 61 and the concrete wall 62 with the gradation value of "0". As a result, an immobile portion within the image 51 is regarded as the background, and each of the gradation values thereof is replaced with the gradation value of "0".

Also, the temperature cutting-out portion 31 outputs image data on the image 52 which is obtained by replacing each of the gradation values of the images of the house 61 and the concrete wall 62 with the gradation value of "0" to the superposing portion 34 (Step S2 in FIG. 3). The superposing portion 34 temporarily stores therein the image data on the image 52. That is to say, the superposing portion 34 temporarily stores therein the image data on the image 52 in which only the image of the person 63 of the image 51 captured by the far-infrared camera 11 is taken.

On the other hand, the visible-light camera 12 outputs image data on the image (refer to FIG. 4C) captured thereby to the background image extracting portion 33 (Step S3 in FIG. 3).

When image data on an image 54 (refer to FIG. 4D) captured at a preceding timing with respect to the image capturing timing for the image 53 is previously inputted, the background image extracting portion 33 compares the image 53 inputted this time with the image 54 inputted last time to extract a difference between the image 53 and the image 54. As a result, the background image extracting portion 33 creates an image 55 (refer to FIG. 5A). Here, a portion indicated by slant lines in the image 55 corresponds to the difference portion.

Next, the background image extracting portion 33 writes image data on the portion other than the difference portion (other than the slant line portion in FIG. 5A) of the image 55 to the memory 14 (Step S4 in FIG. 3).

Next, the visible-light camera 12 outputs image data on an image 56 (refer to FIG. 5B) captured at a subsequent timing with respect to the image-capturing timing for the image 53 to the background image extracting portion 33 (Step S5 in FIG. 3).

When the image data on the image 56 is inputted to the background image extracting portion 33, the background image extracting portion 33 compares the image 53 with the image 56 to extract a difference between the image 53 and the image 56. As a result, the background image extracting portion 33 creates an image 57 (refer to FIG. 5C). Here, a portion indicated by slant lines in the image 57 corresponds to the difference portion.

Figure 5A:
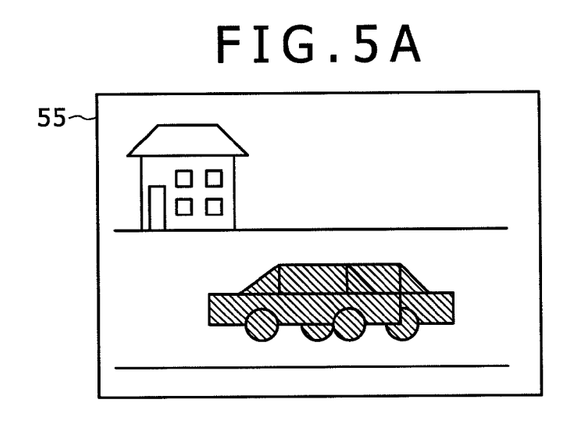
FIGS. 5A to 5D are respectively views showing another concrete example of an image processed by the hybrid camera shown in FIG. 2.
Figure 5B:
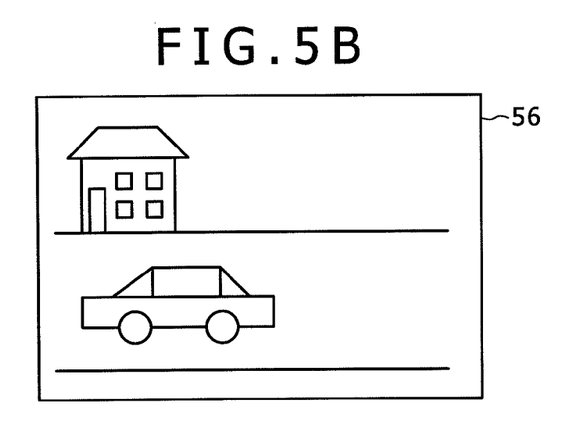
Figure 5C:
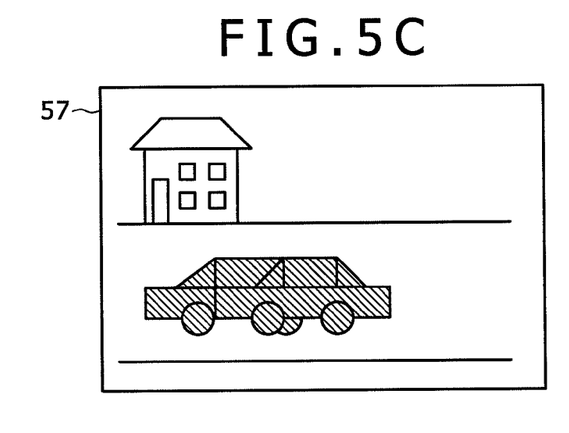
Figure 5D:
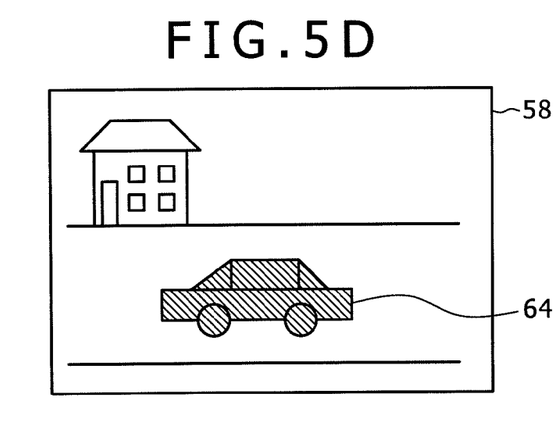
Figure 6A:
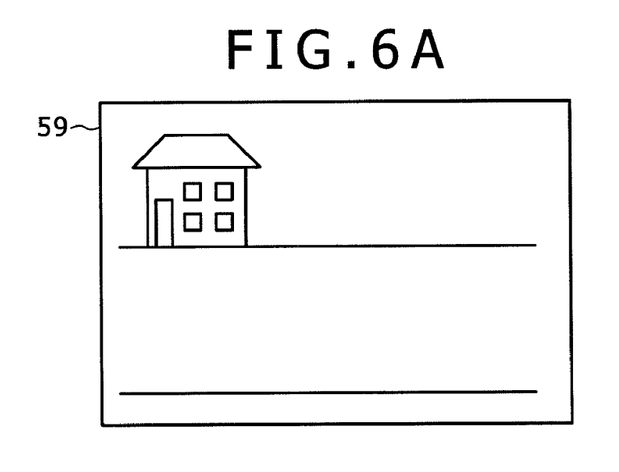
FIGS. 6A and 6B are respectively views showing still another concrete example of an image processed by the hybrid camera shown in FIG. 2.
Figure 6B:
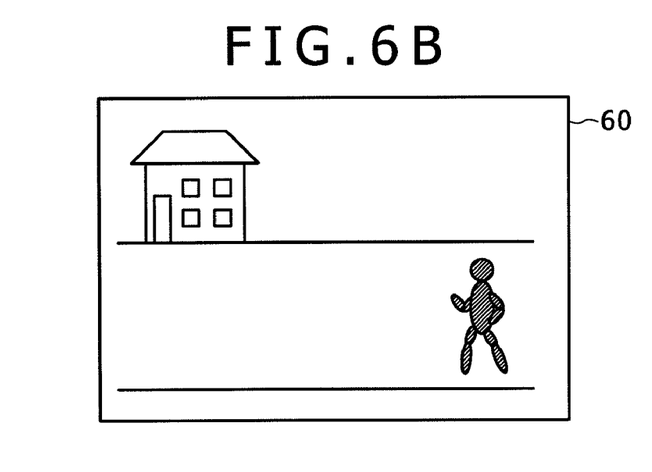

Next, the background image extracting portion 33 arithmetically operates a logical sum (OR) of the image data on the image 55, and the image data on the background of the image 57 to extract the background and a portion 64 other than the background, thereby creating an image 58 (refer to FIG. 5D). Also, the background image extracting portion 33 writes image data on the resulting image 58 to the memory 14 (Step S6 in FIG. 3).

Here, comparing the image 58 with the image 54, it is understood that a portion (a position of a car) other than the background in FIG. 58 moves more leftward (located on a left-hand side) than a portion (a position of the car) other than the background in the image 54 moves. That is to say, the image processing circuit 13 repeatedly executes the processing from Steps S2 to S6, which results in that the portion other than the background is removed because of its leftward movement. Finally, the superposing portion 34 can extract an image (background image) 59 (refer to FIG. 6A) by removing the image of the moving portion from the image captured by the visible-light camera 12. This processing will be described in detail later.

Next, the superposing portion 34 fetches the image data on the background image 59 from the memory 14 (Step S7 in FIG. 3), and image-synthesizes the background image 59, and the image 52 with each other. Specifically, the superposing portion 34 uses the image data on the image 59 for the portion corresponding to the pixel value of "0" of the image 52, and uses the image data on the image 52 for any of the portions other than that portion.

Next, the superposing portion 34 transmits image data on an image 60 obtained through the image synthesis (refer to FIG. 6B) to the server 2 (Step S8 in FIG. 3).

It is noted that although the timing at which this processing starts to be executed is not especially limited, preferably, this processing is executed at the timing described below.

For example, the image processing circuit 13 is provided with a function of detecting a level of a signal about a luminance of the visible-light image. So, when the signal level is equal to or higher than a certain threshold value, the image processing circuit 13 extracts the background image 59. Also, when the signal level is equal to or higher than the certain threshold value, the setting is carried out such that the image data on the image captured by the visible-light camera 12 is directly outputted to the server 2.

On the other hand, when the signal level becomes equal to or lower than the certain threshold value, the image synthesis of the background image 59 and the image 52 starts to be carried out.

Performing such control results in that for example, this processing is not executed in the daytime for which the image excellent in visibility is obtained, and thus the image synthesis can be performed only for the evening to the morning through the nighttime.

Next, processing (extracting processing) for extracting the background image 59 will be described in detail with reference to FIG. 7.

Figure 7:
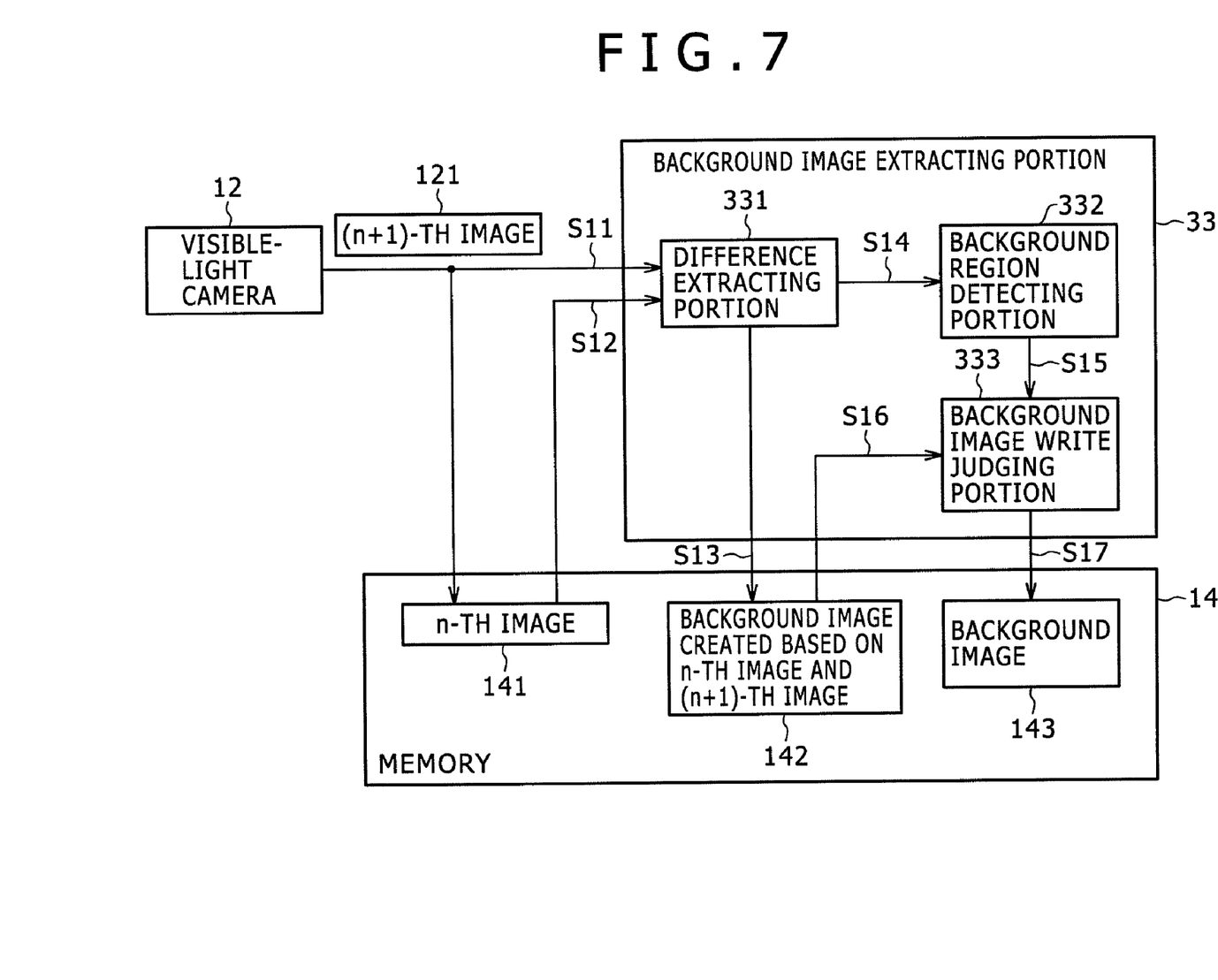
FIG. 7 is a block diagram showing extracting processing executed in the hybrid camera shown in FIG. 2.

FIG. 7 is a block diagram showing the extracting processing executed in the hybrid camera shown in FIG. 2.

The background image extracting portion 33 is composed of a difference extracting portion 331, a background region detecting portion 332, and a background image write judging portion 333.

The difference extracting portion 331 extracts a difference between an n-th background image (n-th image) 141 image data on which is stored in the memory 14, and an (n+1)-th image ((n+1)-th image) 121.

The background region detecting portion 332 sets a value of a pixel portion which is judged to be the background until the n-th image 141 is captured as "−1" and holds therein this value. On the other hand, the background region detecting portion 332 sets a value of a pixel portion which is not yet judged to be background as "0" and holds therein this value.

The background image write judging portion 333 executes predetermined processing for the image which the background region detecting portion 332 processes, and writes image data on the resulting image to the memory 14.

The difference extracting portion 331 takes in the image data on the n-th image 141 (Step S12 in FIG. 7) approximately at the same time that the image data on the (n+1)-th image 121 is taken therein (Step S11).

Next, the difference extracting portion 331 detects a difference between the n-th image 141 and the (n+1)-th image 121, and inputs image data on an image, obtained in the corresponding pixels, which has no difference in the form of the image data on a background image 142 created based on the n-th image 141 and the (n+1)-th image 121 to the memory 14 (Step S13 in FIG. 7).

In addition, the difference extracting portion 331 sets a value of a pixel portion which is judged to have no difference as "1", and outputs this value to the background region detecting portion 332 (Step S14 in FIG. 7).

When an input value of a certain pixel portion is "−1", and a value of a pixel portion corresponding to the image the image data on which is stored in the background region detecting portion 332 is "0", the background region detecting portion 332 writes the value of "−1" to the pixel portion concerned. On the other hand, when the value of the pixel portion corresponding to the image the image data on which is stored in the background region detecting portion 332 is "1", the background region detecting portion 332 holds the value of "1" as it is.

Next, the background image write judging portion 333 executes the following processing for the pixel having the value of "−1" detected by the background region detecting portion 332.

That is to say, the background image write judging portion 333 reads out the image data on the image from the image data on the background image 142 created based on the n-th image 141 and the (n+1)-th image 121 (Step S16 in FIG. 7). Only when the value of the pixel portion to which the image the image data on which is outputted from the background region detecting portion 332 is "−1", the background image write judging portion 333 writes that value of "−1" to the image data on the background image 142 from which the image data on the image is read out (Step S17 in FIG. 7). Making the background image correspond to the concrete examples, for example, shown in FIGS. 4A to 4D to FIGS. 6A and 6B, the background image becomes an image corresponding to the image 58 in a stage in which the processing from Steps S11 to S17 is executed once. On the other hand, the background image finally becomes an image corresponding to the image 59 in a stage in which the processing from Steps S11 to S17 is repeatedly executed plural times.

After completion of the processing for writing the value to the image data on the background image, the the background image write judging portion 333 changes all the values of "1" detected by the background region detecting portion 332 to the values of "1", and outputs these values of "1" as the image data on the background image 143.

This is the completion of execution of the extracting processing.

As has been described so far, according to the image pickup system including the hybrid camera of this embodiment, after the image processing is executed in the hybrid cameras 1, 1, the hybrid cameras 1, 1 transmit the image data on the resulting images to the server 2, respectively. Therefore, the amount of image data can be further reduced in the image pickup system including the hybrid camera of this embodiment than in the case where the image data on the images is individually transmitted from the cameras to the server 2, and the image processing for the images thus individually transmitted is executed on the server 2 side. As a result, it is possible to lighten the load in the data processing imposed on the server 2 side.

In addition, the image captured by the far-infrared camera 11 is superposed on the image, captured by the visible-light camera 12, which is visible to the eyes of the human being with the image captured by the visible-light camera 12 as the background image. Therefore, it is possible to provide the image which is easily understandable in terms of the visual sense of the human being night and day (especially, in the nighttime).

It is noted that although the embodiment has been described based on a combination of the far-infrared camera 11 and the visible-light camera 12, this combination is not especially limited thereto. That is to say, it is also cope with a combination with any other suitable camera as long as the hybrid camera uses the visible-light camera.

In addition, although in the embodiment described above, only the temperature zone portion is cut out by utilizing the cutting-out method, the present embodiment is by no means limited thereto. That is to say, a method of cutting a temperature zone square may also be adopted. In addition, the image captured by the far-infrared camera 11 may be directly superposed on the image captured by the visible-light camera 12 without cutting out the temperature zone portion. As a result, for example, an image of a human being portion can be made transmissive to the background image. Also, in the phase of the superposition, it is preferable that a ratio of the image captured by the far-infrared camera 11 to the image captured by the visible-light camera 12 is set as 7:3. As a result, it is possible to improve the visibility.

In addition, although only the temperature cutting-out is performed by utilizing the cutting-out method, the present embodiment is by no means limited thereto. That is to say, for example, an image of a moving object may be cut out, and an image may be created in which a gradation value of an image of an object other than an object an image of which is cut out under both the conditions is replaced with the gradation value of "0" (white). As a result, it is possible to more reliably cut out only the image of the object which the user desires to cut out.

Although the image pickup apparatus of the present embodiment has been described so far based on the illustrated embodiment, the present embodiment is by no means limited thereto. That is to say, the constitutions of the portions can be replaced with any suitable ones of portions having the same functions. In addition, any other arbitrary constituent elements and processes may be added to the present embodiment.

In addition, in the present embodiment, arbitrary two or more constitutions (features) of the embodiment described above may be combined with one another.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup hybrid camera for outputting image data on an image, for which image processing is executed, to a computer, said image pickup hybrid camera comprising:
   a thermal image capturing portion capturing a thermal image;
   a visible-light portion capturing an image under a visible light;
   a temperature zone extracting portion for detecting and extracting a portion corresponding to a predetermined temperature zone, input from an external device, from the thermal image;
   a background image extracting portion for extracting an image of an immobile object, in the image captured under the visible light by said visible-light portion, as a background image; and
   a synthesizing/outputting portion for synthesizing the portion extracted by said temperature zone extracting portion, and the background image extracted by said background image extracting portion with each other, and outputting image data on a resulting synthetic image to the external device.

2. The image pickup hybrid camera according to claim 1, wherein said thermal image capturing portion is a camera for capturing a far-infrared radiation.

3. The image pickup hybrid camera according to claim 1, further comprising:
   a memory for storing image data on the image captured under the visible light by said visible-light portion;
   wherein said background image extracting portion repeatedly executes processing for superposing a moving body portion of the visible-light image captured before last time, and a moving body of the visible-light image captured this time on each other, extracting the background image.

4. The image pickup hybrid camera according to claim 1, further comprising:
   a synchronous signal generating portion for generating a synchronous signal in accordance with which timings at which the thermal image and the visible-light image are captured by said thermal image capturing portion and said visible-light portion, respectively, are made approximately identical to each other.

5. The image pickup hybrid camera according to claim 1, further comprising:
   a register for storing data on the temperature zone.

* * * * *